United States Patent [19]
Yamaguchi

[11] Patent Number: 6,029,234
[45] Date of Patent: Feb. 22, 2000

[54] OUTPUT SYNCHRONIZATION METHOD AND APPARATUS IN A MEMORY SYSTEM UTILIZING SMALL BUFFER SIZE

[75] Inventor: Takashi Yamaguchi, Kaisei-Machi, Japan

[73] Assignee: Fuji Photo Film Co., Ltd., Kanagawa, Japan

[21] Appl. No.: 08/763,663

[22] Filed: Dec. 11, 1996

[30] Foreign Application Priority Data

Dec. 15, 1995 [JP] Japan ................. 7-347128

[51] Int. Cl.[7] .................................................. G06F 13/00
[52] U.S. Cl. ........................... 711/167; 711/100; 711/154
[58] Field of Search ................................ 711/119, 147, 711/118, 154, 167, 100; 395/872; 713/400; 710/56

[56] References Cited

U.S. PATENT DOCUMENTS

| | | |
|---|---|---|
| 4,719,563 | 1/1988 | Kosuge et al. ................. 711/162 |
| 5,161,215 | 11/1992 | Kouda et al. ................... 711/119 |
| 5,329,538 | 7/1994 | Kawano et al. ................. 371/57.2 |
| 5,502,672 | 3/1996 | Kwon ........................... 365/189.05 |
| 5,535,171 | 7/1996 | Kim et al. ..................... 365/233 |
| 5,557,575 | 9/1996 | Lee ............................... 365/221 |
| 5,638,535 | 6/1997 | Rosenthal et al. ............. 711/162 |
| 5,696,990 | 12/1997 | Rosenthal et al. ............. 395/849 |

*Primary Examiner*—Tuan V. Thai
*Attorney, Agent, or Firm*—Sughrue, Mion, Zinn, Macpeak & Seas, PLLC

[57] ABSTRACT

The present invention provides an output synchronization method and apparatus in which an appropriate amount of data can be stored in a buffer memory all the time by detecting a change in output speed of data outputted from the buffer memory and a large amount of data can be handled with a small buffer size. According to the present invention, a change in the output speed of data outputted from a buffer memory, from which data is read and outputted at a time when it is required after input data is stored, is measured, and data inputted to the buffer memory is controlled according to the change in the output speed.

12 Claims, 11 Drawing Sheets

OUTPUT SYNCHRONIZATION METHOD AND APPARATUS IN A MEMORY SYSTEM UTILIZING SMALL BUFFER SIZE

BACKGROUND OF THE INVENTION

1. Field of the Invention

The present invention relates to an output synchronization method and apparatus for properly managing or controlling an amount of data in a buffer memory used for data transfer in an image processing system.

2. Description of the Related Art

An image processing system designed for the printing industry demanding high quality is a system for integrating and editing images such as characters and patterns. In the field of desktop publishing, especially, a page description language such as PostScript is enabling an advanced use of the system. For keeping pace with processing described with a description language used to process the images in an integrated fashion or a processing by a CPU (software), the image processing system for the printing industry must handle too large amount of data. For generating a block copy for printing, when code data alone is outputted, the data must be bit-mapped in units of a character and in advance in units of several rasters. When a bit-mapped image alone is outputted, the whole or part of the output image must be stored temporarily in a buffer memory and then sent to an output unit. For limiting the storage capacity of the buffer memory, the output unit is designed to stand by until the output image is stored in the buffer memory.

Figure 1:
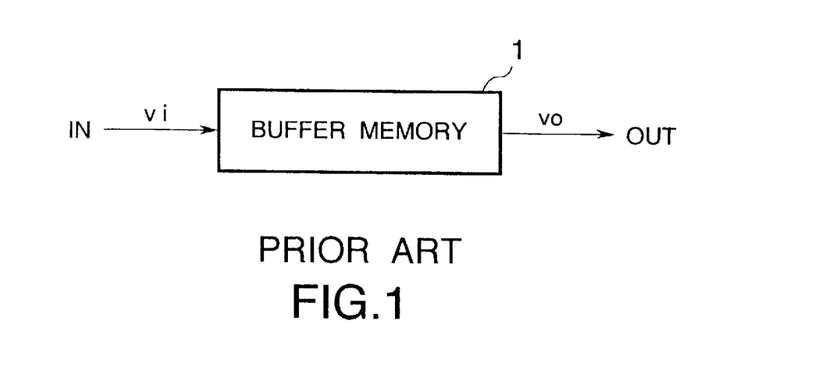
FIG. 1 is a block diagram to show an input and an output of data in a buffer memory.

In the foregoing image processing system, generally, a data output speed on the side of a processing unit is different from a data processing speed on the side of the output unit. As shown in FIG. 1, when the moving speed vi of incoming data on the input side IN is different from the moving speed vo of outgoing data on the output side OUT, it is required to interpose a buffer memory 1 between the input and output sides and to manage the data on the output side for fear input of data to the output unit should be discontinued.

Figure 2:
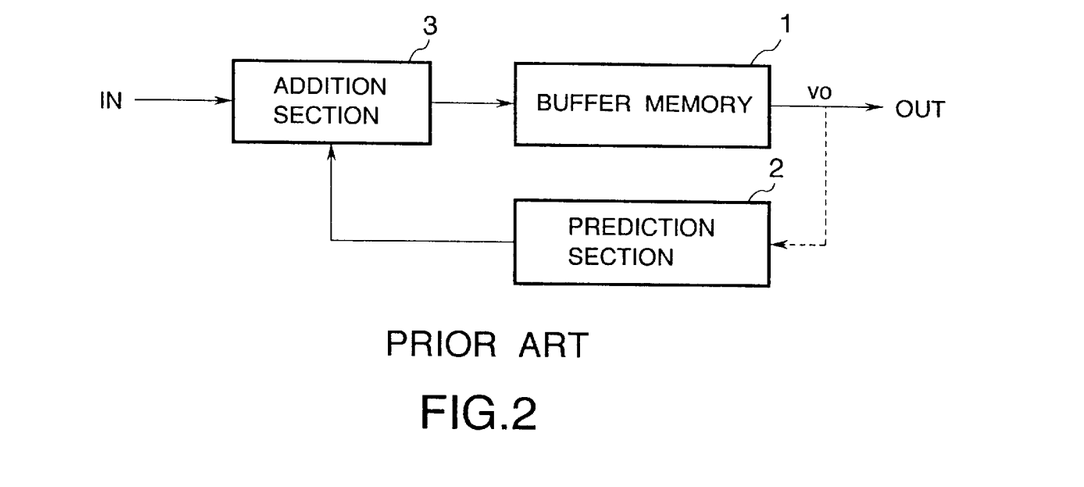
FIG. 2 is a block diagram to show an example of control to be given to a buffer memory in a prior art.
Figure 3:
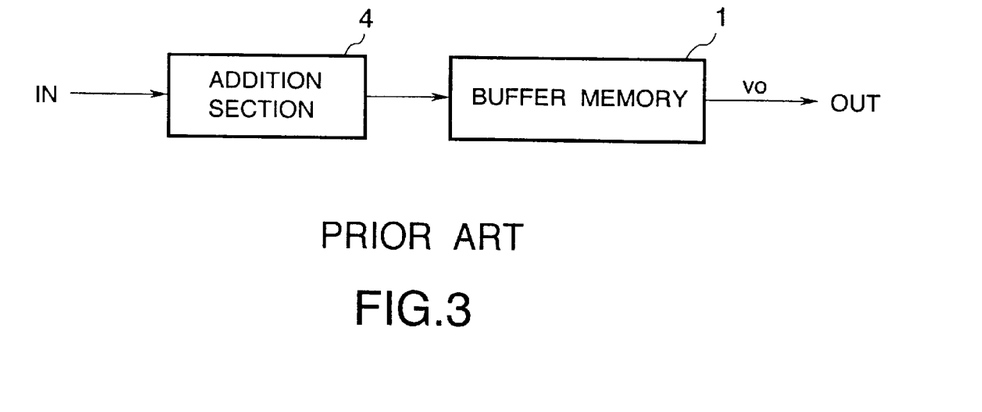
FIG. 3 is a block diagram to show an another example of control to be given to a buffer memory in a prior art.

In the prior art, therefore, as shown in FIG. 2, a prediction section 2 predicts the moving speed vo on the output side OUT, and an addition section 3 located on the input side IN adds an extra amount of data. However, there are drawbacks that the prediction section 2 cannot predict the speed vo continually and measures, therefore, cannot be taken when the speed vo varies over time. Another system is, as shown in FIG. 3, such that an addition section 4 located on the input side IN adds data so as to make the buffer memory 1 full. However, since data is added irrespective of the value of the moving speed vo on the output side OUT, when the moving speed vo is small, a small amount of data must be added little by little at many times. This system poses a problem that it is annoying because the number of processing steps.

SUMMARY OF THE INVENTION

The present invention has been devised under the circumstances, and an object of the present invention is to provide an output synchronization method and apparatus in which an appropriate amount of data can be stored in a buffer memory all the time by measuring a speed change in data output from the buffer memory and a large amount of data can be handled with a small buffer size.

The present invention relates to an output synchronization method for a buffer memory from which data is read and outputted at a time when it is required after input data is stored therein. The foregoing object of the present invention is accomplished by measuring a change in output speed of data outputted from the buffer memory, and controlling data inputted to the buffer memory according to the change in output speed. Moreover, the change in output speed may be measured by measuring a time interval required until subtraction of the number of data items outputted from the buffer memory from an initial value results in zero.

The present invention relates to an output synchronization apparatus for a buffer memory from which data is read and outputted at a time when it is required after input data is stored therein. The foregoing object of the present invention is accomplished by including a data addition unit for adding a data inputted to said buffer memory, a counter for performing subtraction of the number of data items outputted from said buffer memory, an initial value setting unit for setting an initial value for said counter, a timer for measuring a time interval, and a control unit for storing a time interval measured by said timer, controlling the components, and calculating a change in output speed of data outputted from said buffer memory, and by actuating said data addition unit according to the calculated change in output speed.

In the present invention, the number of data items outputted from the buffer memory is subtracted from an initial value of the counter, and a time interval required until the subtracted value becomes zero is measured. Thereby, a change in output speed of data on the output side of the buffer memory is detected. Even when the output speed on the output side of the buffer memory increases transiently, data can be supplied to an output unit or the like but the buffer memory will not be emptied. Moreover, an amount of data in the buffer memory can be confined to a given range all the time, and a large amount of data can be handled with a small buffer size.

DESCRIPTION OF THE PREFERRED EMBODIMENTS

An image processing system that is a precondition for the present invention will be illustrated and described.

Figure 4:
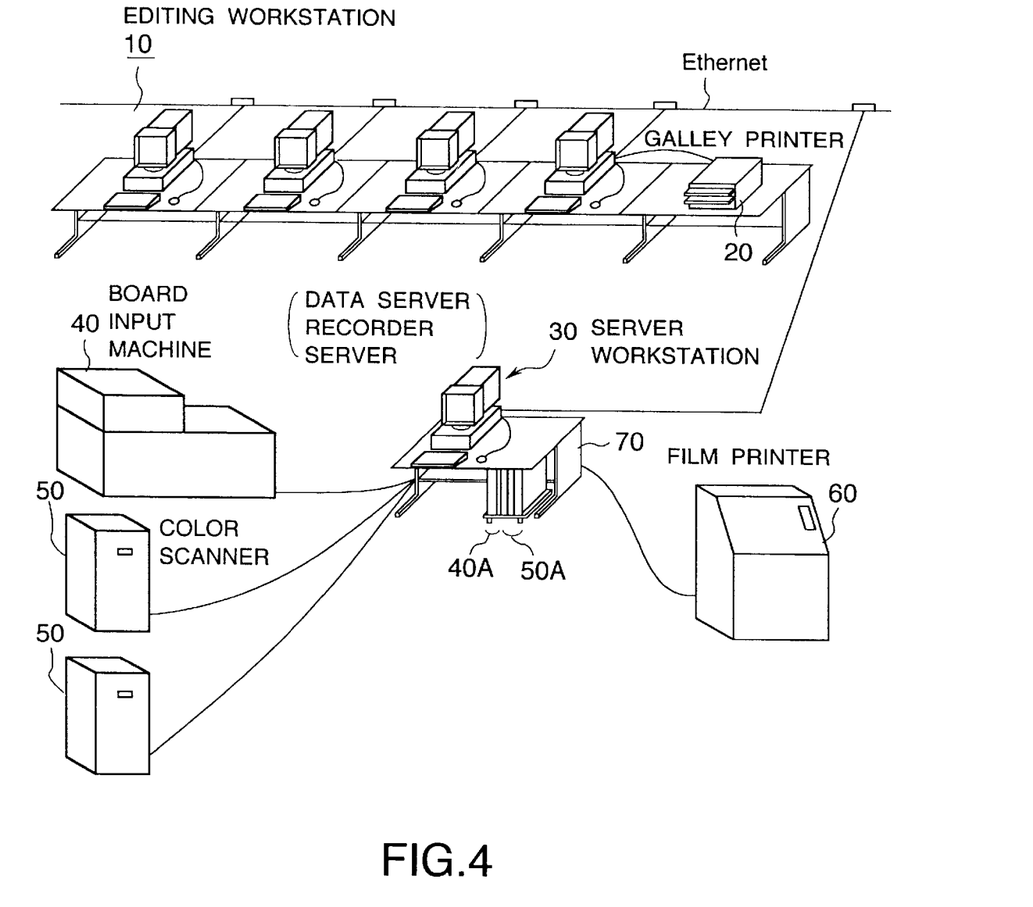
FIG. 4 is an overall connection diagram to show an example of a configuration of an image processing system in which the present invention can be implemented.

FIG. 4 shows an example of an overall configuration of an image processing system in which the present invention can be implemented. A plurality of editing workstations 10 are interconnected through an Ethernet (interface). A galley printer 20 for performing galley proof at a relatively low image quality is connected to one of the workstations 10. A server workstation 30 having facilities of a data server and recorder server is also connected on the Ethernet. A board input machine 40 for reading a printing layout board and inputting read data is connected to the server workstation 30 via an input controller 40A. A plurality of color scanners 50 for separating the colors of color images or monochrome images composed of patterns, characters, graphics and the like, and then for reading and inputting the separated colors are operatively connected to the server workstation 30 via a plurality of input controllers 50A. Furthermore, a film printer 60 for outputting a high-quality image is connected to the server workstation 30 via an output synchronization buffer memory 70 that has a stretch function, a tint laying function, a merge (between a line drawing and a continuous-tone (monotone) image) function, and a buffering function and that attains a synchronism.

Figure 5:
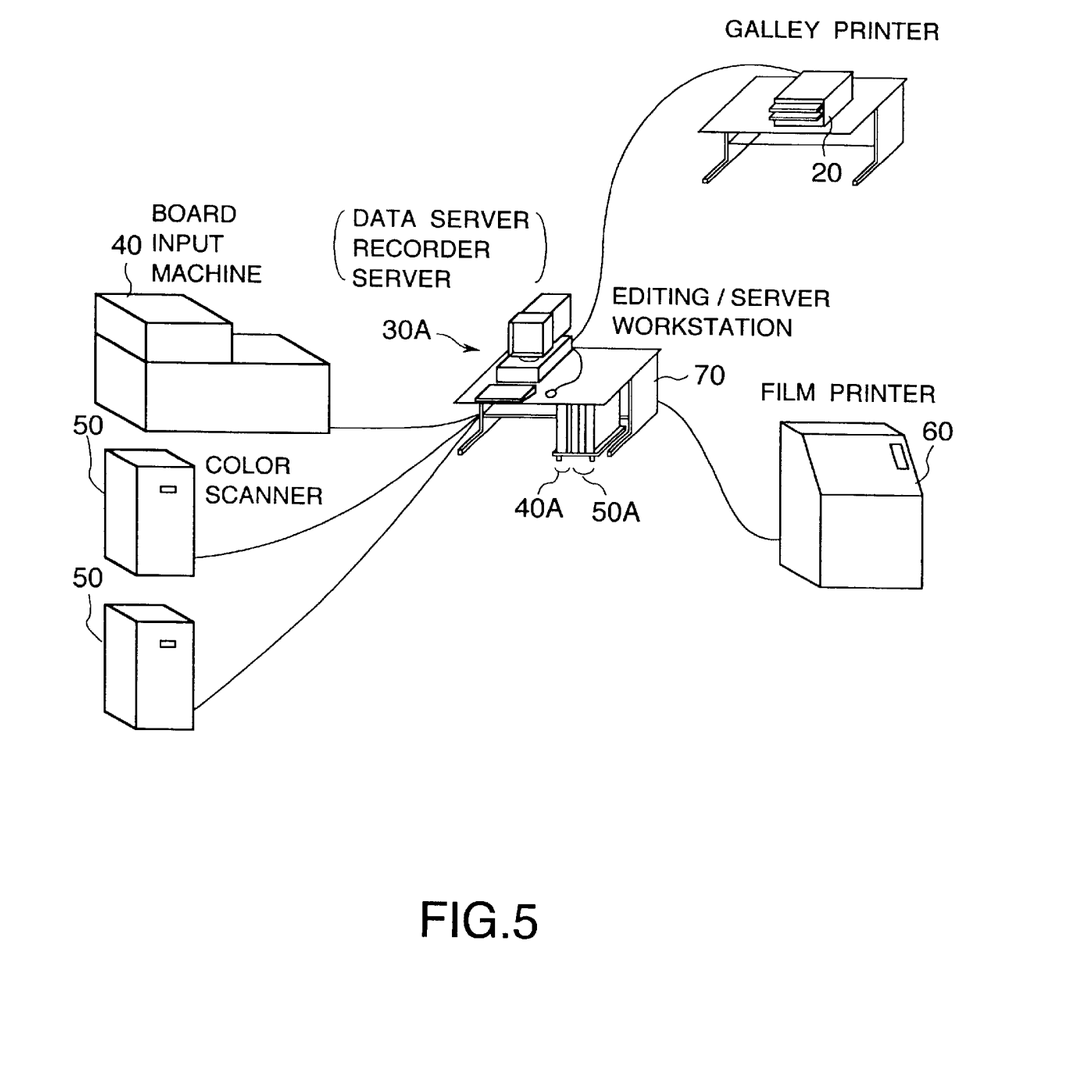
FIG. 5 is an overall connection diagram to show an example of another configuration of an image processing system in which the present invention can be implemented.

FIG. 4 shows an example in which a plurality of editing workstations 10 and one server workstation 30 are mutually coupled in systematic fashion. Alternatively, as shown in FIG. 5, one editing/server workstation 30A may be used to realize a stand-alone configuration. Each workstation has a facility for fetching and processing other information from an external unit (for example, information within a local area network (LAN) or information sent from another computer system). In the examples of configurations in FIGS. 4 and 5, the output synchronization buffer memory 70 is interposed between the server workstation 30 and the film printer 60. Alternatively, the output synchronization buffer memory 70 may be incorporated in the film printer 60.

Figure 6:
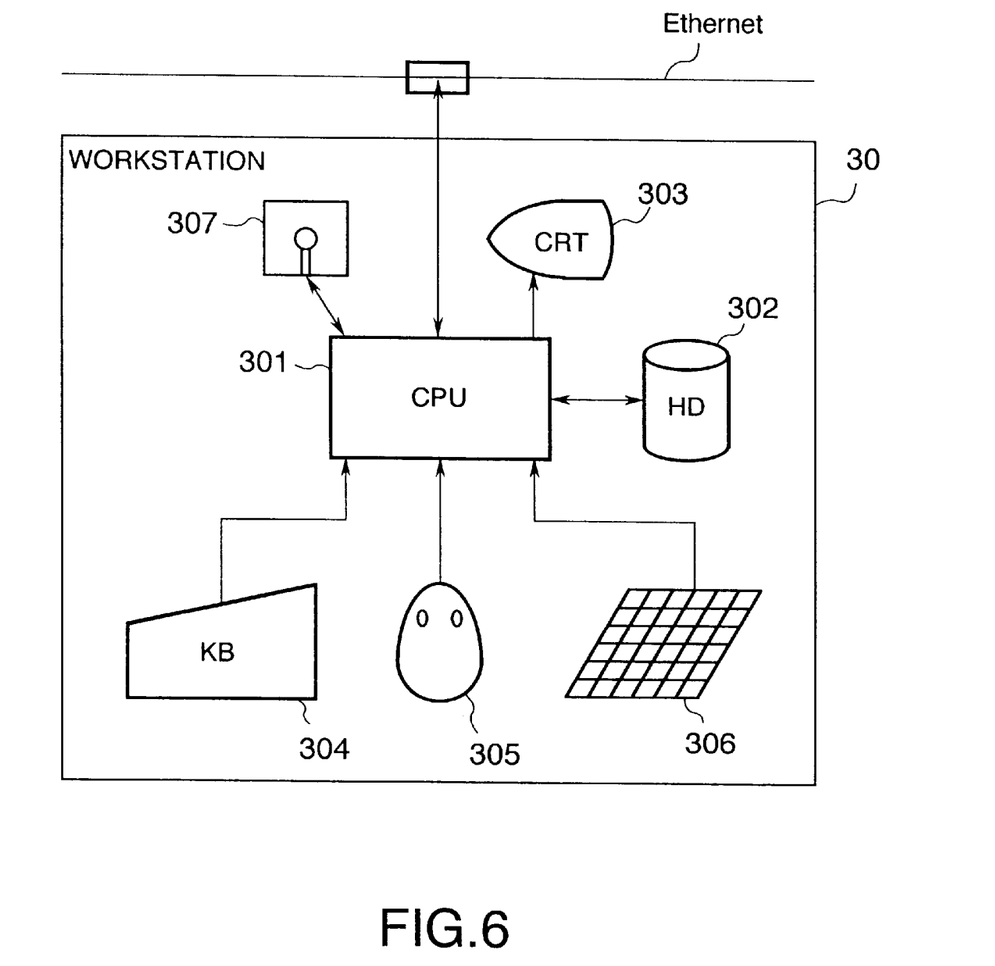
FIG. 6 is a block configuration diagram to show an example of a hardware configuration of a workstation.

Both the editing workstations 10 and the server workstation 30 can assume various forms depending on the system configuration. Herein, the editing workstations 10 and the server workstation 30 shall have the same hardware configuration for convenience sake, and the details of an example of the hardware configuration will be shown in FIG. 6 and described below. The workstation 30 (or 10) includes a CPU (Central Processing Unit) 301 for controlling the whole system and a hard disk 302 for storing necessary information, a CRT (or Display Unit) 303 serving as a display means, and a keyboard 304, a mouse 305, a digitizer 306 serving as an input manipulation means and further includes a pointing means (not shown) such as a trackball, joystick or the like. A floppy disk (FD) 307 serving as a storage means can be mounted in the workstation 30.

Figure 7:
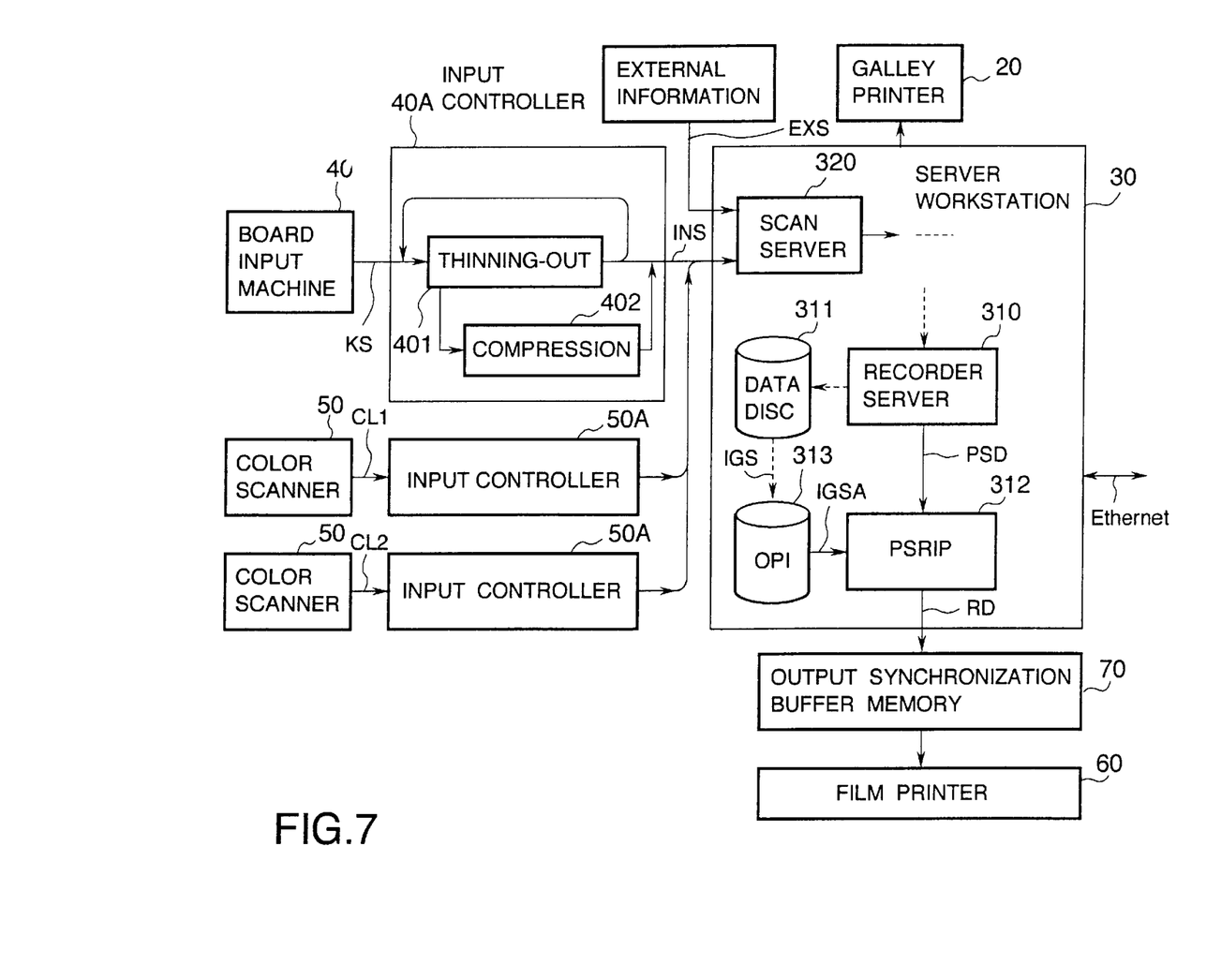
FIG. 7 is a block diagram to show an example of an overall configuration of an input controller and a server workstation in an image processing system in which the present invention can be implemented.

FIG. 7 is a block diagram showing the overall configuration of the system shown in FIG. 4. A board information KS (one bit) read by the board input machine 40 is sent to the workstation 30 via the input controller 40A. Color information CL1 and CL2 (=32 bits or monochrome information of black=8 bits) of four colors (cyan, magenta, yellow and black (CMYK)) read by the plurality of color scanners 50, 50 are respectively sent to the workstation 30 via the input controllers 50A, 50A. The input controller 40A (50A) performs high-density data processing for producing a high-quality image and coarse-density data processing intended for display or the like simultaneously in parallel, whereby a high-speed processing is realized as a whole and an effective data processing is realized. The input controllers 40A and 50A have the same configuration. A thinning-out unit 401 thins out the data repeatedly on a feedback basis. The inputted board information KS (CL1 or CL2) is thinned out at, for example, integral ratios such as 1/2, 1/3, . . ., 1/6, . . . , 1/n. Needless to say, the thinning-out is not executed in the thinning-out unit 401 for the high-density data required to output the high-quality image. Moreover, in the input controller 40A (50A), not only the thinning-out of the data is carried out but also data compression is executed by a compression unit 402. The thinned-out and compressed data is temporarily stored in a buffer memory (not shown).

Data (one bit (line drawing information), 8 bits (monochrome image), 32 bits (full-color image)) temporarily stored in the input controller 40A (50A) is inputted as an input information INS to the server workstation 30. External information EXS sent from another personal computer or the like connected to an external system is also inputted to the server workstation 30. The server workstation 30 includes a scan server 320 for converting the format of each input information INS and registering an image, and a recorder server 310 for executing management of output jobs. Layout information (information for specifying the layout and sizes of characters, graphics, tables, photographs and the like according to a plan) PSD sent from the recorder server 310 is inputted to a raster image processing unit (PSRIP) 312. The server workstation 30 further includes a data disk 311 for storing image data. Image data IGS read from the data disk 311 is inputted to an image change unit (Open PrePress Interface) 313. Image data IGSA changed by the image change unit 313 is inputted to the raster image processing unit 312, and converted into a raster image by the raster image processing unit 312. At this time, a pattern and the like in the image data are expressed with halftone dots. Consequently, raster data RD that may be compressed if necessary is inputted to the output synchronization buffer memory 70. The output synchronization buffer memory 70 synchronizes data output with the printing speed of the film printer 60. As for the compressed data, it is stretched. Furthermore, merge or tint laying is carried out in the output synchronization buffer memory 70. The resultant data is then transmitted to the film printer 60.

Figure 8:
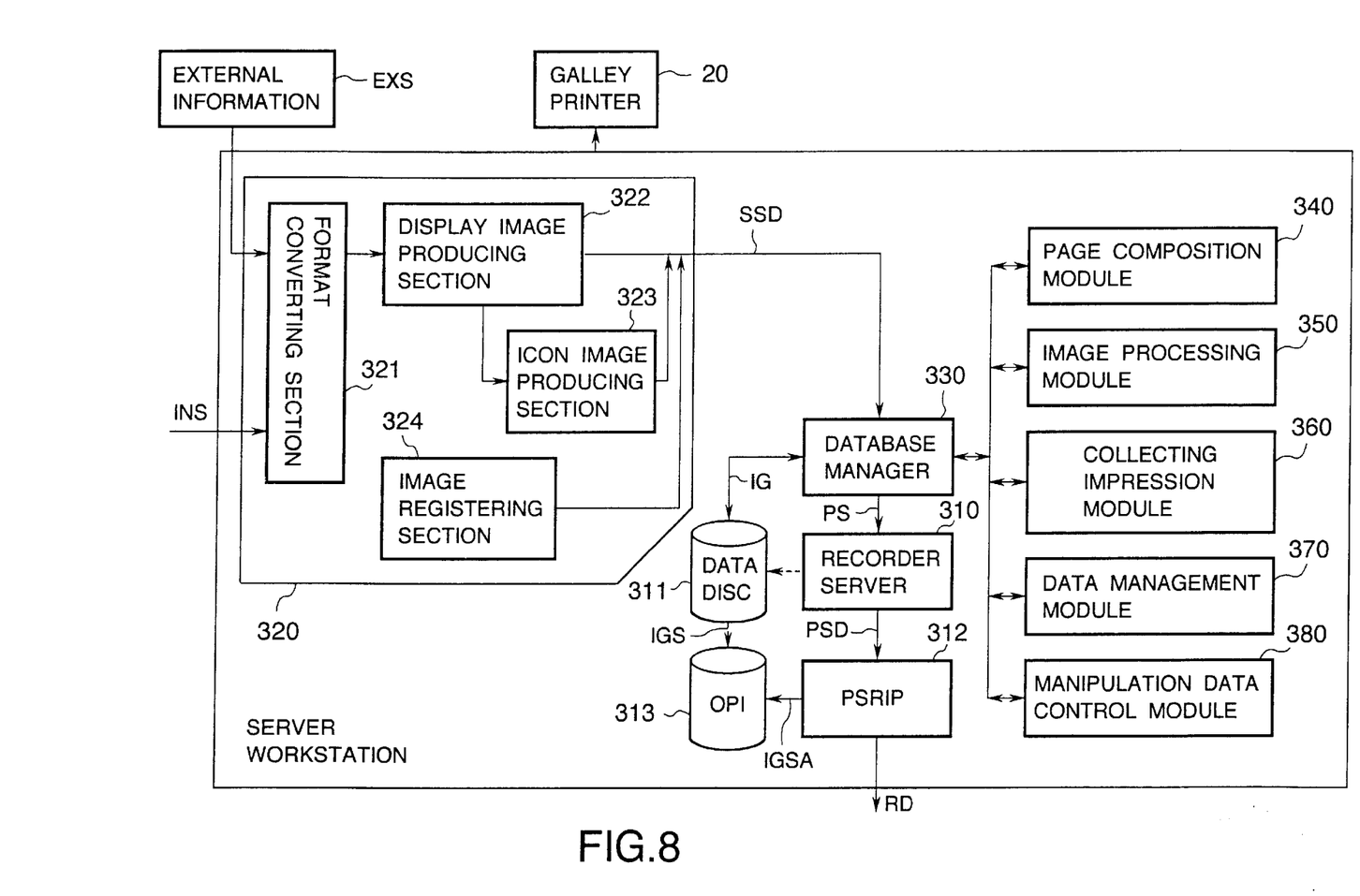
FIG. 8 is a block diagram to show an example of a software configuration of a server workstation.

FIG. 8 shows the detailed software configuration of the server workstation 30. The input information INS and the external information EXS are inputted to a format converting section 321 within the scan server 320. From data whose format has been converted, an image for display (display image) is produced by a display image producing section 322, and an image for an icon (icon image) is also produced by an icon image producing section 323. The images are registered by an image registering section 324. Registered data SSD of the display image and icon image outputted from the scan server 320 are respectively inputted to a database manager 330 and then stored. Image data IG is inputted to the data disk 311, and the layout data (PostScript data) PS is inputted to the recorder server 310 for managing the output jobs. Connected to the database manager 330 in the form of software are a page composition module 340 for performing assembling for each page, an image processing module 350 for carrying out preprocessing (noise removal, rotation, or the like) of a line drawing, retouch or cutting out of a continuous-tone image or the like, a collecting impression module 360 for collecting and impressing the image data for board arrangement, image arrangement, graphic production, tint laying and the like, a data management module 370 for managing the output jobs or data, and a manipulation data control module 380 for carrying out color editing, hatching and registration of a ground tint.

Figure 9:
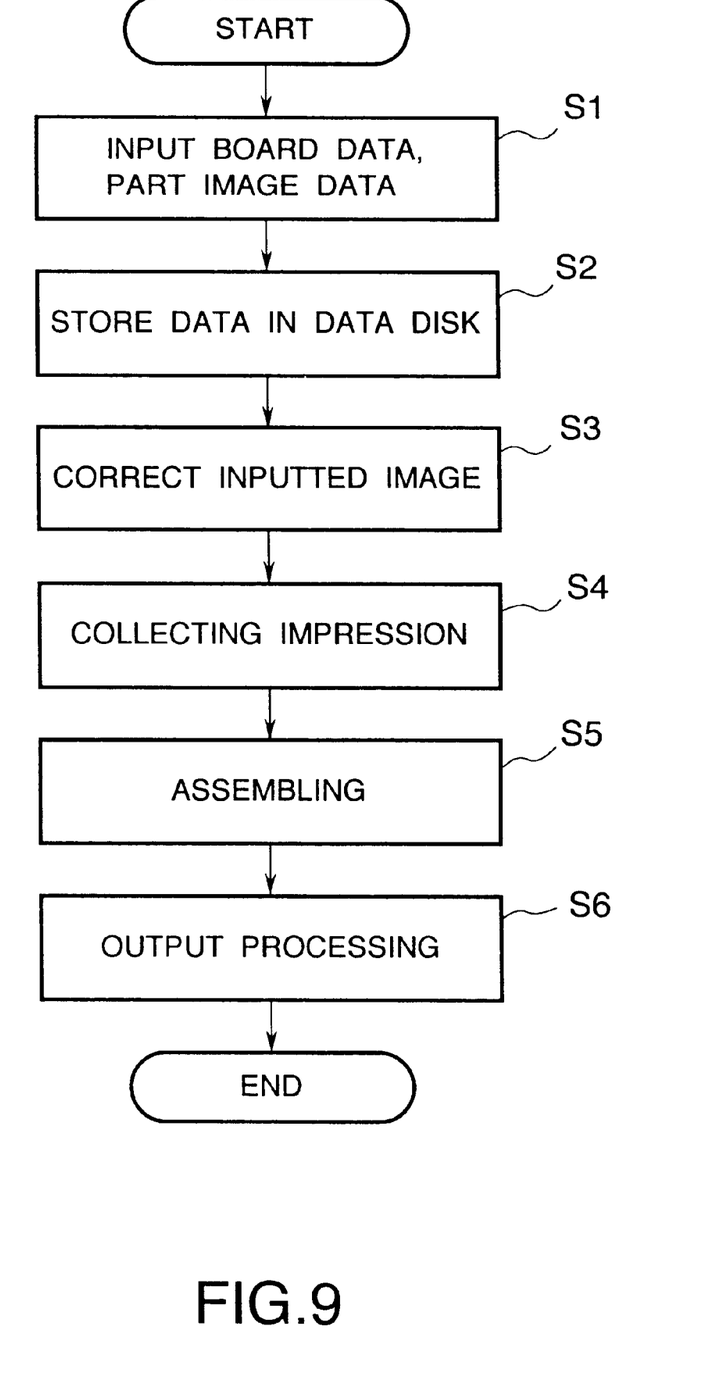
FIG. 9 is a flow chart to show an example of operations of a database manager.

The processing operations of the database manager 330 will be described with reference to a flow chart of FIG. 9.

When the registered data SSD of a board, a part image and the like transmitted from the scan server 320 is inputted (Step S1), the data SSD is stored as the image data IG in the data disk 311 by way of the database manager 330 (Step S2). For data correction, the database manager 330 reads the image data from the data disk 311, and allows the image processing module 350 to perform the retouch (correction work intended to correct colors, gradation, flaws or the like), dust removal, cutting-out or the like on the image data. The resultant data is stored in the data disk 311 by way of the database manager 330 (Step S3). Thereafter, the database manager 330 carries out the collecting impression (for placing a board, arranging the parts on the board, processing the characters, and thus synthesizing the parts such as characters, a graphic, an image and the like according to a designated layout) (Step S4). The database manager 330 first reads the image data IG from the data disk 311 and then allows the collecting impression module 360 to carry out a collecting impression work. The processed data is stored in the data disk 311 by way of the database manager 330. The database manager 330 then reads the image data IG from the data disk 311 and uses the page composition module 340 to gives instructions for assembling and carry out assembling work. Assembling data is stored in the data disk 311 by way of the database manager 330 and then subjected to assembling (Step S5). Data is then fetched from the data disk 311 into the database manager 330, and is processed and outputted by the recorder server 310 (Step S6).

Figure 10:
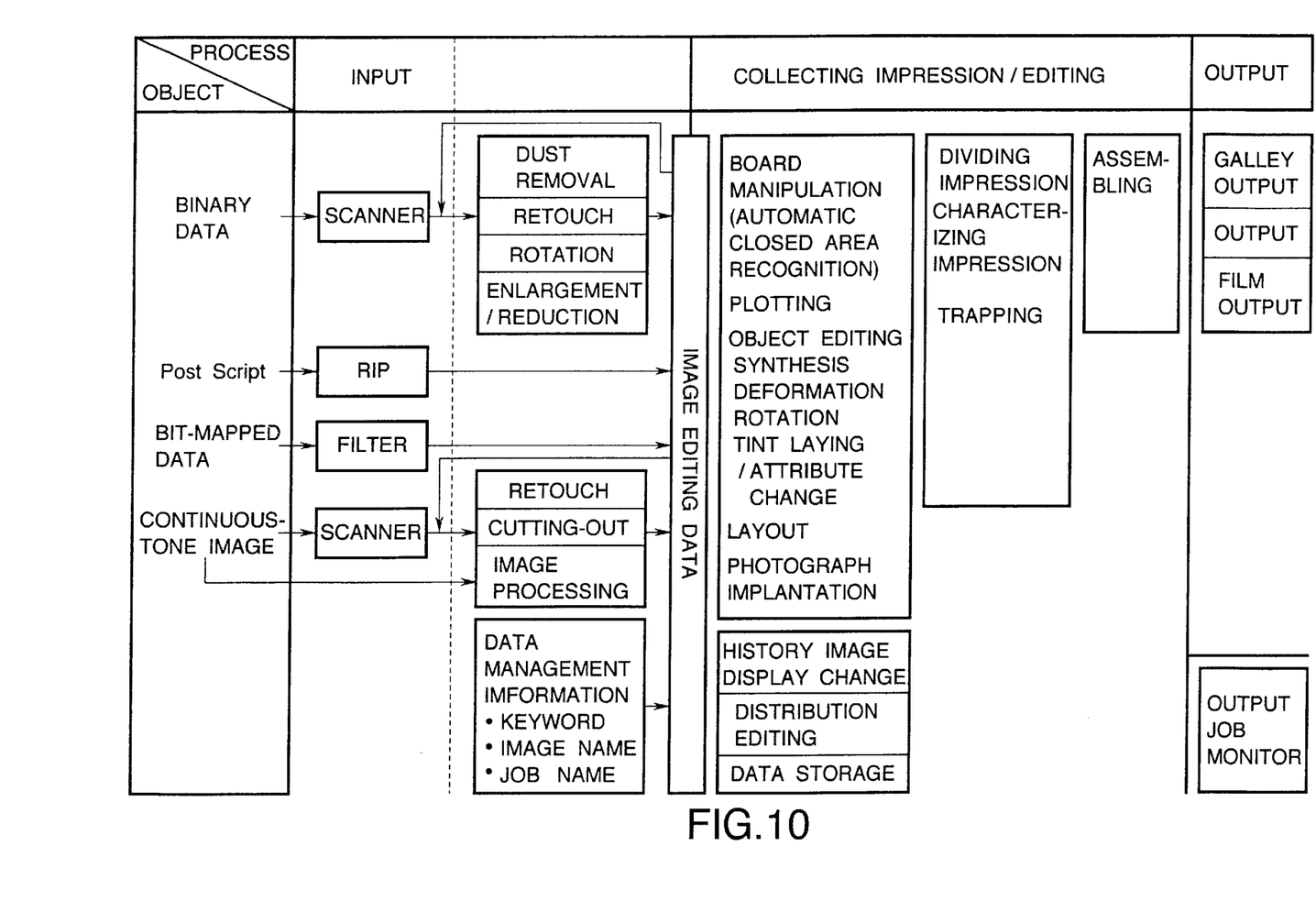
FIG. 10 is a flow chart on data and functions to show the relationships between objects and processes of input data.

FIG. 10 shows the relationships between objects of the input data (binary data, layout information, bit-mapped data, and continuous-tone image) and processes (input, collecting impression/editing, and output) as flows of data and functions recognizable by an operator. The binary data of line drawings, boards or the like is read by the board input machine 40 or the color scanners 50, subjected to such processing as dust removal, retouch, rotation and enlargement/reduction, and thus provided as image editing data. PostScript information is processed by a raster image processor (RIP) (for developing the data expressed with a page description language such as PostScript and converting the data into the bit-mapped data or the like) and then appended to the image editing data. The bit-mapped data has the format thereof converted by a filter and is appended to the image editing data. A continuous-tone image is read by the color scanners 50 or directly inputted to the server workstation 30, subjected to retouch, cutting-out, and image processing, and then appended to the image editing data. A keyword, image name and job name which are data management information are also appended to the image editing data. The image editing data is subjected to board manipulation (automatic closed area recognition), plotting, object editing, synthesis, deformation, rotation, tint laying/attribute change, layout, photograph implantation, and the like. Moreover, history image display change, distribution editing, and data storage are executed for the image editing data. After these processing steps are completed, dividing impression, characterizing impression, and trapping are carried out, and assembling for each page is carried out. Thus, collecting impression/editing is completed. The "characterizing impression" is impression for laying any ink other than normally-employed colors of cyan, magenta, yellow and black, and is adopted, for example, (1) for laying golden red color in the background painted with a black ink in two-color impression, (2) for laying gold or silver color, (3) for laying an ink over normally-employed colors of cyan, magenta, yellow and black for separately impressing a woman's lip-sticked lips in a photograph so that the color of the lipstick can be expressed brightly. The "trapping" means that an ink is laid over another little by little in order to prevent creation of a blank due to mismatched printing during register matching or matching of registers of patterns, characters and the like. Data resulting from collecting impression and editing performed by the server workstation 30 is outputted as a galley outputted from the galley printer 20, as a PDL (page description language, for example, PostScript) output, and as a film outputted from the film printer 60.

Figure 11:
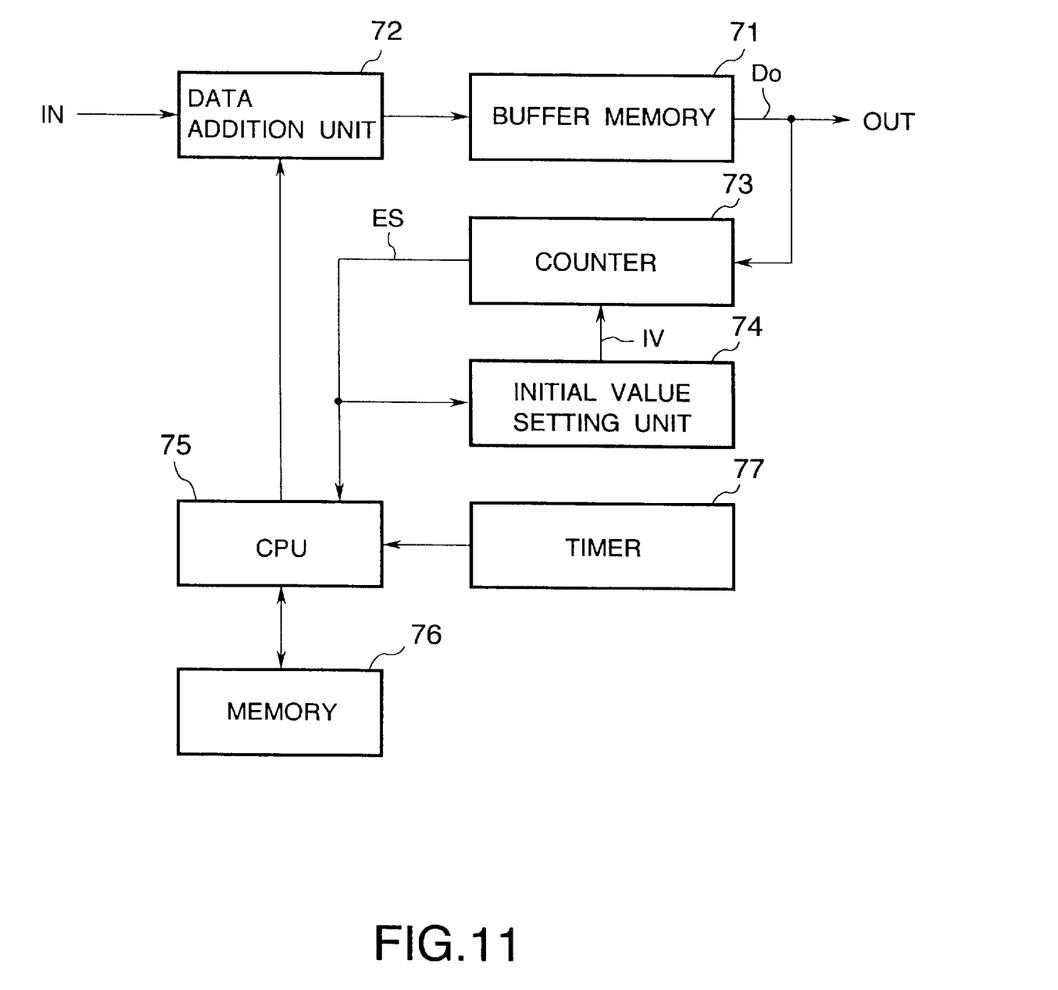
FIG. 11 is a block configuration diagram to show an embodiment of the present invention.

The present invention can apply to the input controller 40A (50A) and output synchronization buffer memory 70, which are shown in FIG. 7, in the foregoing image processing system. Examples of constituent features of the present invention are shown in FIG. 11 and will be described below.

A data addition unit 72 is located on the input side of a buffer memory 71. Output data $D_o$ of the buffer memory 71 is inputted to a counter 73 and used for subtraction. A CPU 75 uses an initial value setting unit 74 to set an initial value IV for the counter 73, and stores a time data sent from a timer 77 in a memory 76. When a calculated value resulting from the subtraction performed by the CPU 73 becomes "0", the counter 73 outputs an empty signal ES that is inputted to the CPU 75 and the initial value setting unit 74. On receipt of the empty signal ES from the counter 73, the CPU 75 references the time instant indicated by the timer 77, calculates a data output speed on the output side, determines an amount of data to be added to the buffer memory 71 on the basis of the calculated output speed, and gives an instruction to the data addition unit 72.

Figure 12:
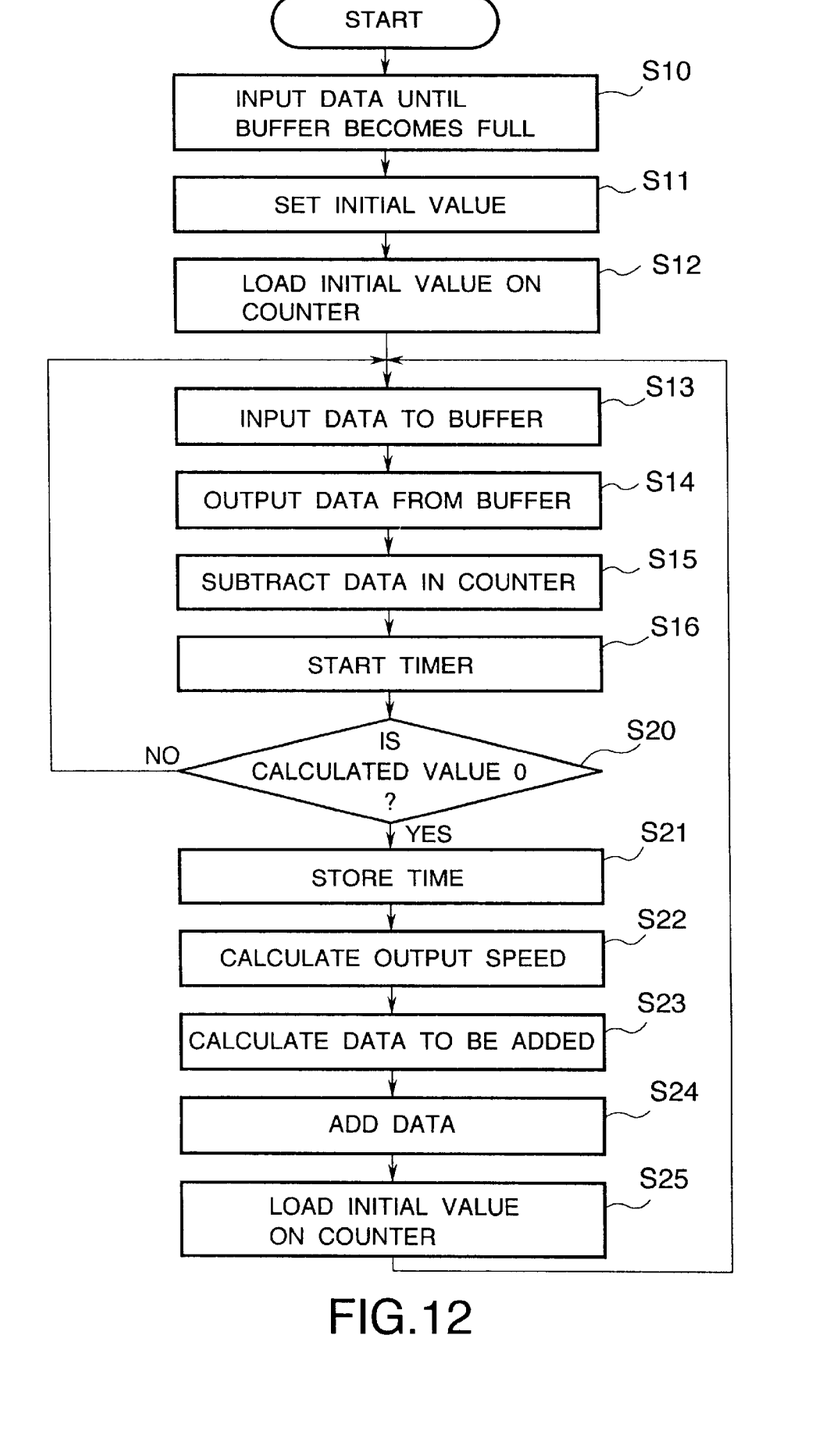
FIG. 12 is a flow chart to show an example of operations in the present invention.

The operations of the foregoing components will be described with reference to a flow chart of FIG. 12.

Figure 13:
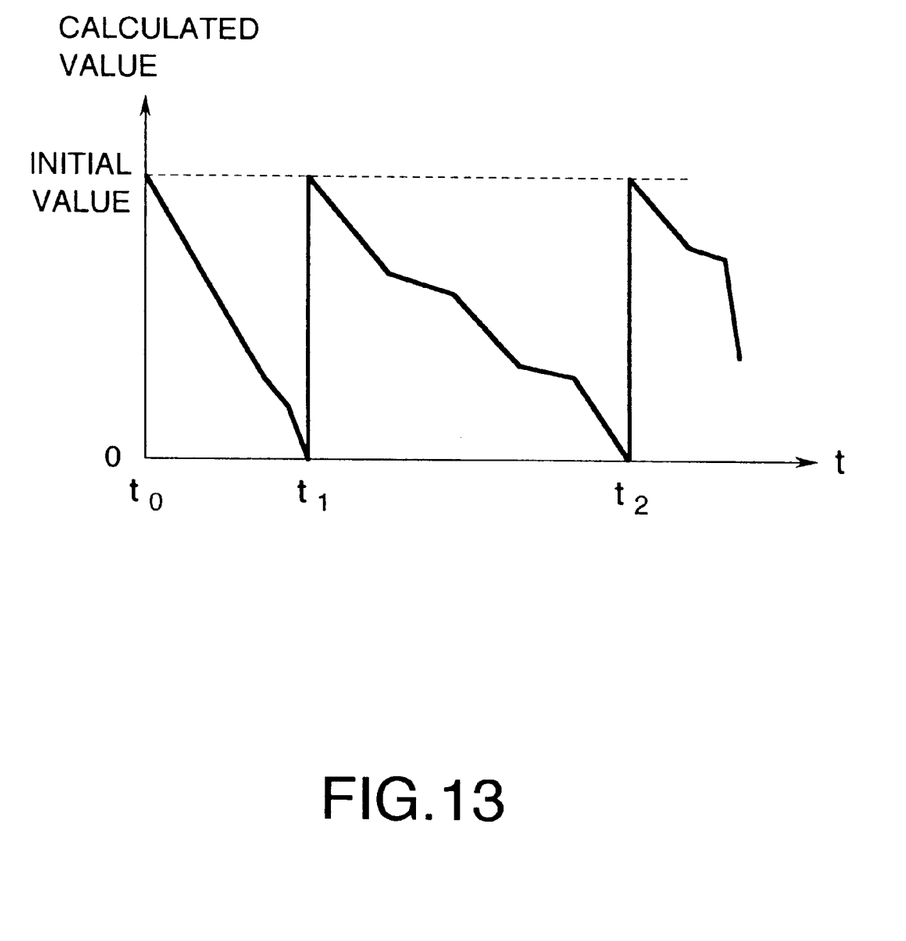
FIG. 13 is a time chart to show an example of an amount of data stored in a buffer memory.

First, the CPU 75 allows the data addition unit 72 to input the data to the buffer memory 71 until the buffer memory 71 becomes full (Step S10), allows the initial value setting unit 75 to set an initial value IV (Step S11), and loads the initial value IV on the counter 73 (Step S12). A time instant t0 in FIG. 13 is the time instant at which the initial value IV is loaded on the counter 73. The time instant t0 is stored in the memory 76. Data is then inputted to the buffer memory 71 via the data addition unit 72 (Step S13). At the same time, the data $D_o$ is outputted from the buffer memory 71 to the output side (Step S14). The output data $D_o$ is inputted to the counter 73 and used for subtraction (Step S15). At the same time, the timer 77 is started to operate the counting (Step S16). When the counted value in the counter 73 is not "0", the above Step S13 and thereafter are repeated (Step S20). When the counted value in the counter 73 becomes "0" as a result of subtraction of the output data $D_o$ (time instant t1), the counter 73 outputs the empty signal ES that is inputted to the CPU 75. The CPU 75 then stores the time data provided by the timer 77 in the memory 76 (Step S21). The CPU 75 calculates the output speed of the output data $D_o$ by calculating the time interval from the time instant t0 to time instant t1 (Step S22), calculates an amount of data to be added to the buffer memory 71 on the basis of a change in the calculated output speed (Step S23), and instructs the data addition unit 72 to add the data (Step S24). Moreover, the CPU 75 loads the initial value IV on the counter 73 (Step S25), and returns to the Step S13 so as to repeat the above operations. Data is thus added to the buffer memory 71 according to a change in data output speed, whereby it is prevented that an amount of data in the buffer memory 71 becomes nil.

As described so far, according to the present invention, an output speed of data outputted from a buffer memory is detected, and addition of data is controlled according to a change in the output speed. Even if the output speed on an output side of the buffer memory increases transiently, the buffer memory will not be emptied but data can be supplied to an output unit or the like. Moreover, an amount of data in the buffer memory can be confined to a given range all the time, and a large amount of data can be handled with a small buffer size.

I claim:

1. An output synchronization method for a buffer memory from which data is read and output at a time after input data is stored therein, comprising the steps of:

decrementing a value of a counter when said data is output from said buffer memory;

measuring a time interval required for said value of said counter to reach zero;

measuring a change in output speed of said data output from said buffer memory based upon said time interval, and controlling input of said input data into said buffer memory according to said change in said output speed.

2. An output synchronization method according to claim 1, further comprising the step of:

outputting a predetermined signal when said value of said counter becomes zero.

3. An output synchronization method according to claim 2, wherein said step of measuring said time interval is completed in response to said predetermined signal.

4. An output synchronization method according to claim 2, further comprising the step of:

setting a next initial value of said counter in response to said predetermined signal.

5. An output synchronization method according to claim 3, further comprising the step of:

setting a next initial value of said counter in response to said predetermined signal.

6. An output synchronization method according to claim 1, wherein said input data is an image data and said output synchronization method is applied to an image processing system.

7. An output synchronization apparatus for a buffer memory from which data is read and output at a time after input data stored therein, comprising:

a data addition unit for adding input data into said buffer memory;

a counter for subtracting a number of said data output from said buffer memory from an initial value;

an initial value setting unit for setting said initial value in said counter;

a timer for measuring a time interval required for said counter to reach a value of zero; and a control unit for storing a value of said time interval measured by said timer, and calculating a change in output speed of said data output from said buffer memory based upon said value;

wherein said data addition unit is actuated according to a calculated change in said output speed.

8. An output synchronization apparatus according to claim 7, wherein said control unit calculates the change in output speed based on a time when a counted value of said counter which is measured by said timer becomes "0" by a subtraction from said initial value.

9. An output synchronization apparatus according to claim 8, wherein said counter outputs a predetermined signal when said counted value becomes "0".

10. An output synchronization apparatus according to claim 9, wherein said control unit references and stores a time measured by said timer based on said predetermined signal.

11. An output synchronization apparatus according to claim 9, wherein said initial value setting unit sets a next initial value in said counter based on said predetermined signal.

12. An output synchronization apparatus according to claim 10, wherein said initial value setting unit sets a next initial value in said counter based on said predetermined signal.

* * * * *